United States Patent
Lahham

[11] Patent Number: 6,056,259
[45] Date of Patent: May 2, 2000

[54] TUNED VIBRATION NOISE REDUCER

[75] Inventor: Jamil I. Lahham, Ruckersville, Va.

[73] Assignee: Sperry Marine Inc., Charlottesville, Va.

[21] Appl. No.: 09/055,194

[22] Filed: Apr. 4, 1998

[51] Int. Cl.[7] .................................................. F16M 1/00
[52] U.S. Cl. ........................................... 248/638; 248/632
[58] Field of Search .................................. 248/638, 618, 248/621, 632, 634, 560, 583

[56] References Cited

U.S. PATENT DOCUMENTS

| | | | |
|---|---|---|---|
| 3,425,652 | 2/1969 | Leary | 248/632 |
| 3,780,207 | 12/1973 | Crosby et al. | 174/42 |
| 5,012,174 | 4/1991 | Adkins et al. | 318/649 |
| 5,267,720 | 12/1993 | Brazell et al. | 248/638 |
| 5,775,049 | 7/1998 | Fricke | 52/720.1 |
| 5,820,348 | 10/1998 | Fricke | 416/248 |
| 5,905,804 | 5/1999 | Lee | 381/386 |

*Primary Examiner*—Anita M. King
*Attorney, Agent, or Firm*—Seymour Levine; Gerald L. Lett

[57] ABSTRACT

A tuned additive mass to a body subjected to forced vibrations that reduces the vibration amplitudes. The mass is coupled to the body in a manner that establishes a node at the previous maximum response of the body to the applied forces. The mass is constructed to respond in a spring like manner so that vibration frequencies of the mass is tunable to provide counter vibrations in the vibration frequency band. Vibration amplitude reduction is establish by vibrations of the mass that are in phase oppositions of the body.

20 Claims, 7 Drawing Sheets

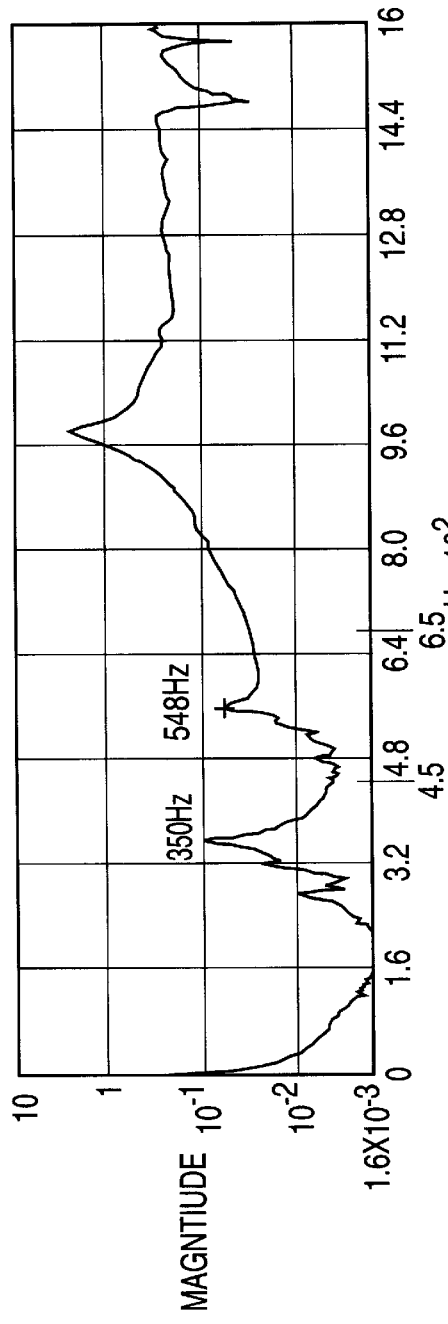
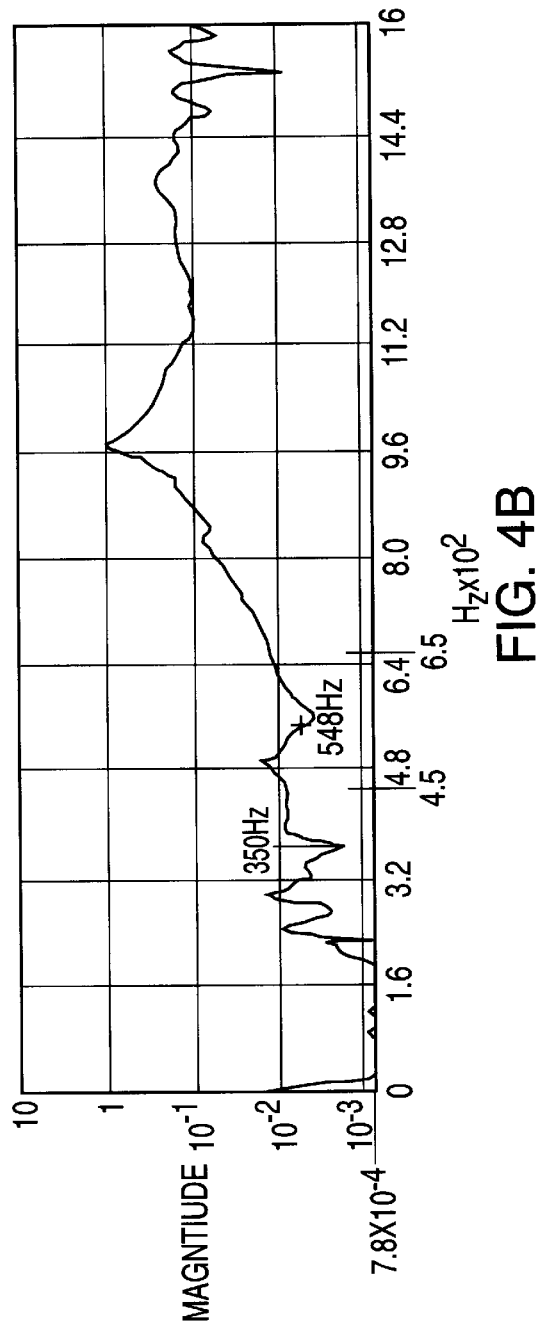
FIG. 4A
FIG. 4B

TUNED VIBRATION NOISE REDUCER

BACKGROUND OF THE INVENTION

1. Field of the Invention

The invention relates to the field of vibration isolators, and more particularly to apparatus for reducing structure-borne noise due to vibrations induced on a platform by a moving mass mounted thereon.

2. Description of the Prior Art

Ring laser gyroscopes (RLG) utilize two monochromatic laser beams propagating in opposite directions about a closed loop. Rotation of the apparatus about the loop axis effectively increases the beam path length in one direction and decreases the beam path in the opposite direction. Since the laser frequencies of the two counter-rotating beams are functions of the lasing path length, the differential path length established by the rotation of the RING causes a frequency difference between the two beams. The magnitude and sign of this frequency difference are representative of the RLG's rate and direction of rotation and may be monitored for these purposes in manners well known in the art. At low rotation rates, the frequency difference between the counter-rotating beams is small and the beams tend to resonate at the same frequency, i.e. lock-in, and the RLG appears to be stationary. This lock-in prevents the RLG from sensing rotation rates that are at or below the lock-in rate. To reduce the lock-in rate, the RLG is mechanically oscillated, dithered, about the its axis to establish rotation in one direction and then the other. Such dithering provides a signal at the output terminals that is substantially independent of the mechanical oscillation while maintaining an apparent rotation in each direction, thus reducing the lock-in rotation rate.

The dithering causes the structure on which the RLG is mounted to vibrate, thereby generating structure-borne noise which adversely effects equipment mechanically coupled to the mounting structure. One method of the prior art for reducing structure-borne noise is disclosed in U.S. Pat. No. 5,012,174 issued to Charles M. Adkins, et, al and assigned to the assignee of the present invention. Adkins, et al teach a device which is attached directly to the RLG platform and electronically establishes counter vibrations of the platform to cancel vibrations induced by the dithering RLG. The apparatus taught by Adkins, et al, however, is complex mechanically and electrically and is too expensive for use with the relatively inexpensive RLG.

Another method of the prior art for reducing structure-borne noise is disclosed in U.S. Pat. No. 5,267,720 issued to James R. Brazell, et al and assigned to the assignee of the present invention. Brazell, et al teach the use of a pair of noise attenuator assemblies positioned along mutually perpendicular rotational axes. Each noise attenuator includes a precision ground valve spring captivated in a highly damped elastomeric material molded to a machined housing. Matching of the noise attenuators and alignment of the rotational axes must be performed to close tolerances to achieve the required platform stabilization. Suppression of mechanical resonances of the sensor supporting structure is achieved by applying a viscoelastic constrained layer to 90 percent of the external surfaces. To meet shock, vibration, and structure-borne noise isolation, high precision machining, tight tolerances on molded elastomers, matched preloaded noise attenuators, and extensive inspection are required. Thus, the device is difficult to manufacture and assemble and therefore, costly.

SUMMARY OF THE INVENTION

In accordance with the principles of the present invention structure-borne noise is suppressed, in a desired frequency band, by judiciously attaching an auxiliary mass to the vibrating body, which may be the support frame of a vibrating apparatus such as a ring laser gyro (RLG). The auxiliary mass is constructed with a flexibility (stiffness) to provide spring like action and is attached to the support frame in a manner to force a node (zero motion) at the maximum amplitude position of the support frame's vibrations caused by its response to the undesired resonating frequencies. This construction and method of attachment causes the auxiliary mass to vibrate at the undesired forcing frequency of the RLG in a manner that minimizes the vibration of the support structure. Thus, the natural frequencies of the combined structure, support frame and auxiliary mass, is shifted away from the forcing frequencies of the vibrating apparatus.

These and other aspects of the invention will be more fully understood by referring to following detailed description and the accompanying drawings.

BRIEF DESCRIPTION OF THE DRAWINGS

FIGS. 4A and 4B are graphs of Vibration Magnitude versus Vibration Frequency along a second axis perpendicular to said first axis for forced vibrations of the assembly of FIG. 1 without and with the invention, respectively.

DESCRIPTION OF THE PREFERRED EMBODIMENTS

Figure 1:
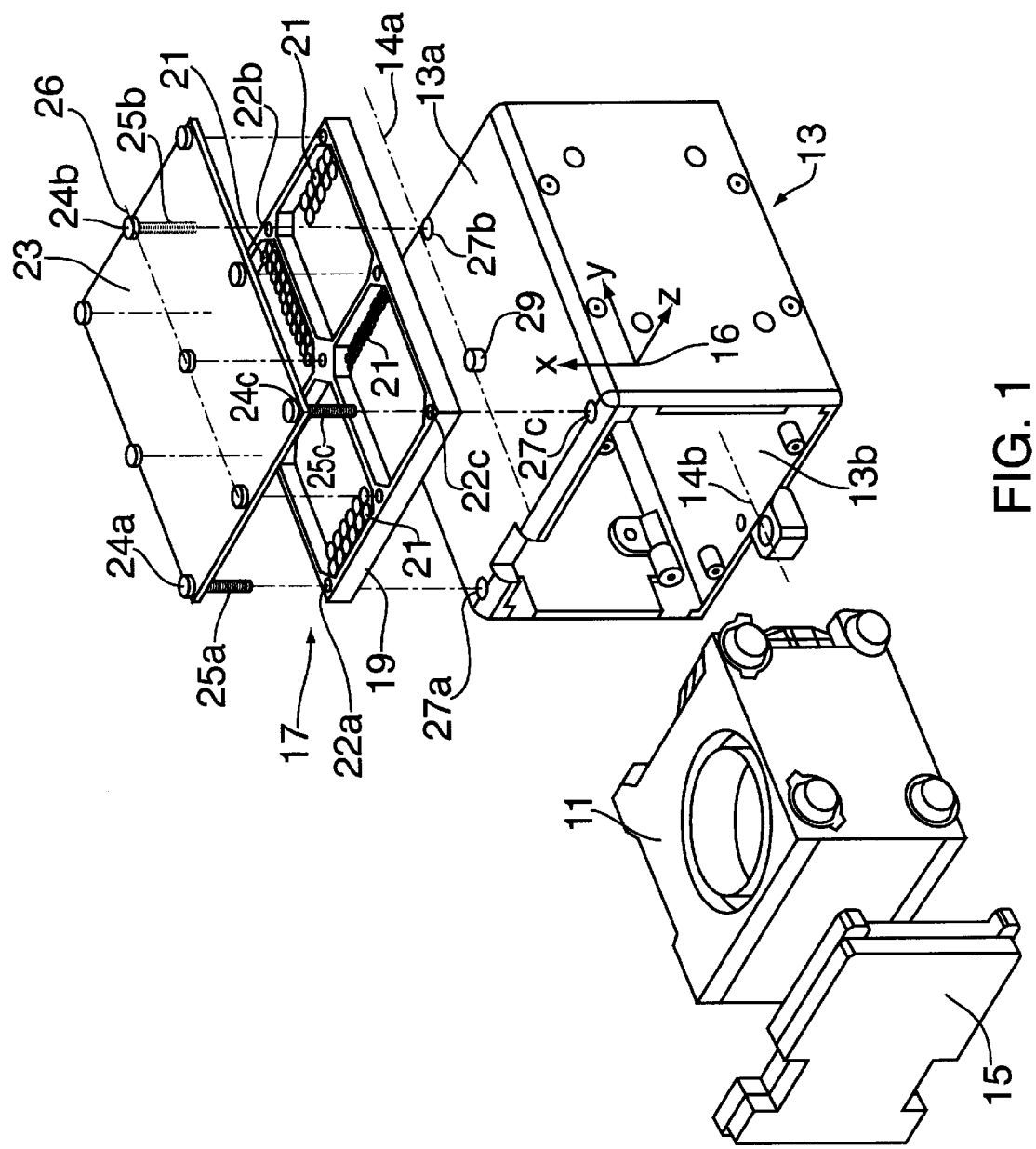
FIG. 1 is an exploded view of an assembly of a vibration forcing unit, its housing, and a preferred embodiment of the invention.

Refer now to FIG. 1. A vibrating device 11, such as a dithered RLG, may be positioned in housing 13, which may be closed by a cover 15 containing the electronics required for the RLG operation. The housing 13 includes a top wall 13a having a center line 14a and a bottom wall 13b having a center line 14b. External forces acting on a body cause the body to vibrate at the forcing frequencies generated by the external forces. Vibrations of the device 11, such as the dithering of an RLG, cause forced vibrations of the housing-cover assembly 13,15, which act as a unit body. The forced vibrations are at frequencies ω, the forcing frequencies generated by the vibrating device 11. To reduce the vibration amplitudes of the housing-cover assembly 13,15 response to the forcing frequencies, the housing-cover assembly 13,15 is designed to have a natural frequency ah that is lower than the lowest forcing frequency. It is well known that the natural frequency of a body is determined from $\omega_0^2 = K/m$, where k is the stiffness of the body and m its mass. Therefore, the natural frequency $\omega_0$ may be positioned below the lowest forcing frequency with the selection of construction material, wall thickness, and points of constraints about the housing to establish the proper ratio of k/m. Forced vibrations of the housing-cover assembly 13,15 may be minimized in the forcing frequency range by judiciously coupling an appropriately designed auxiliary mass thereto. It is well known that the forced vibration amplitude $X_0$ of an undamped vibrating system is $$x_0 = \frac{P_0}{k_0}\left[1 - \left(\frac{\omega}{\omega_0}\right)^2\right]$$

where:

$P_0$ is the amplitude of the exciting force $k_0 = m_0\omega_0^2$ $m_0$ is the mass of the housing-cover assembly 13,15

$\omega$ is the forcing frequency $\omega_0$ is the natural frequency of the housing-cover assembly 13,15

$P_0/k_0$ is the static deflection of a theoretical spring.

The deflection amplitude $x_0$ may be decreased by increasing the mass of the housing-cover assembly. This may be accomplished by coupling an auxiliary mass 17 to the housing-cover assembly 13,15. Coupling the auxiliary mass 17 to the housing-cover assembly 13,15 adds a mass $m_{eq}$ to the overall system that is given by:

$$m_{eq} = \frac{m_{am}}{1 - \left(\frac{\omega}{\omega_{am}}\right)^2}$$

where, $m_{eq}$ is the equivalent mass added by the auxiliary mass system $M_{am}$ is the actual mass of the auxiliary mass assembly 17

$\omega_{am}$ is the natural frequency of the auxiliary mass

The equivalent mass of the auxiliary mass assembly 17 establishes a vibration amplitude for the combined system that is a function of a forced frequency ratio $\beta_{am} = \omega/\omega_{am}$, the mass ratio ($\mu = M_{am}/M$), and the static deflection of the housing-cover assembly 13,15, which may be determined from $$x_0 = \frac{P_0}{k} \frac{(1 - \beta_{am}^2)}{(1 - \beta_{am}^2)(1 - \beta^2) - \beta^2\mu}$$

where $\beta = \omega/\omega_0$

From the above it is evident that the vibration amplitude $x_0$ at a forcing frequency $\omega$ is substantially zero when the auxiliary mass resonance frequency is tuned to the forcing frequency, i.e. $\omega_{am} = \omega$ or equivalently $\beta = 1$.

As previously stated, to minimize vibrations, the housing-cover assembly 13,15 is constructed such that its first fundamental frequency is out of the forcing frequency band of the vibrating device 11. It is preferable that the natural frequency of the assembly 13,15 be chosen below the forcing frequency band. If the vibrating device is a dithered RLG the forcing frequency band is between 450 1 Hz and 650 Hz. To insure suppression of vibrations at the natural frequency of the assembly 13,15 a natural frequency which is lower than the lowest frequency in the forcing frequency band may be chosen and the assembly 13,15 be constructed accordingly.

Figure 2A:
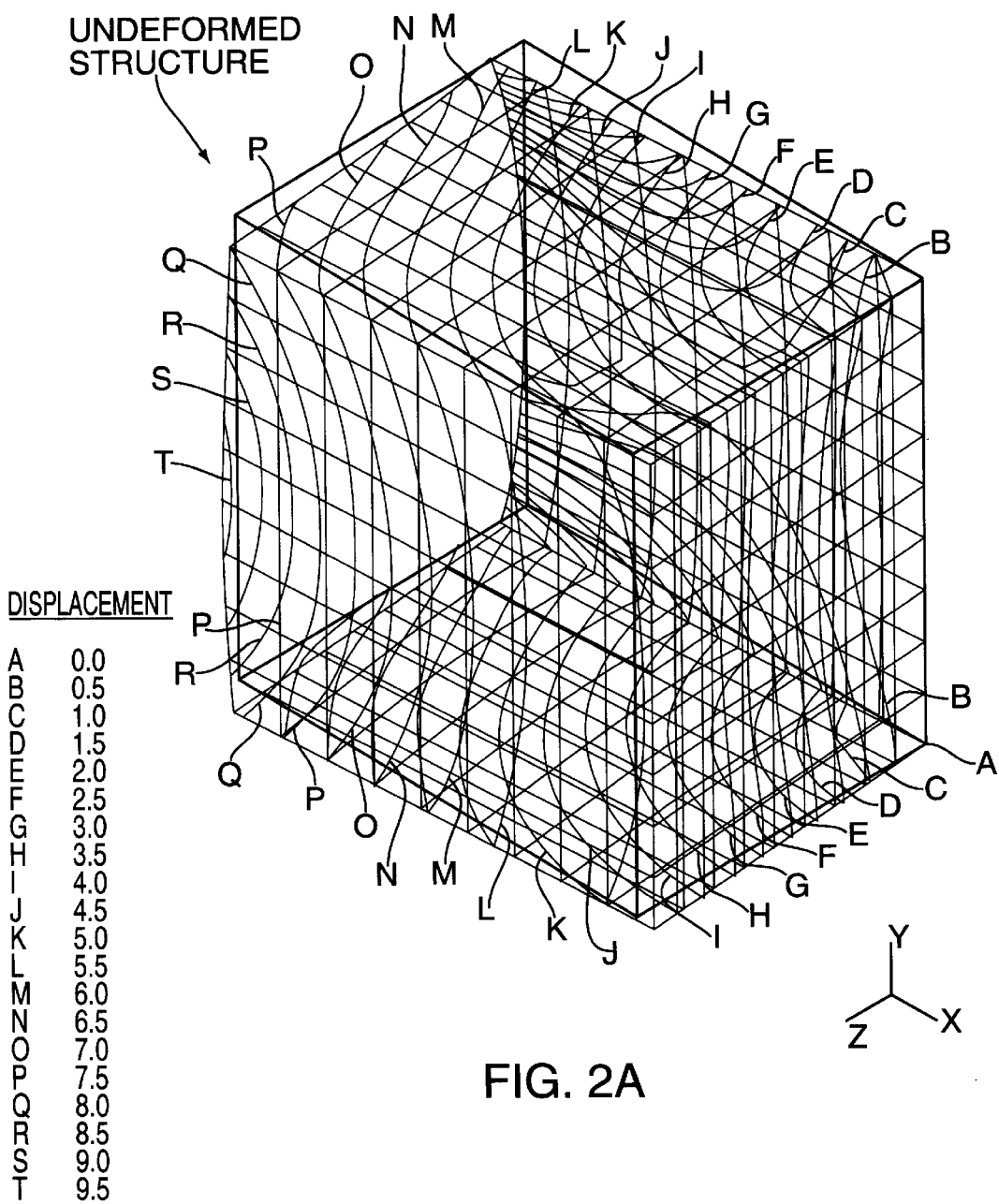
FIGS. 2A, 2B, and 2C are representations of resonance frequencies and associated mode shapes of a housing-cover assembly shown in FIG. 1.
Figure 2B:
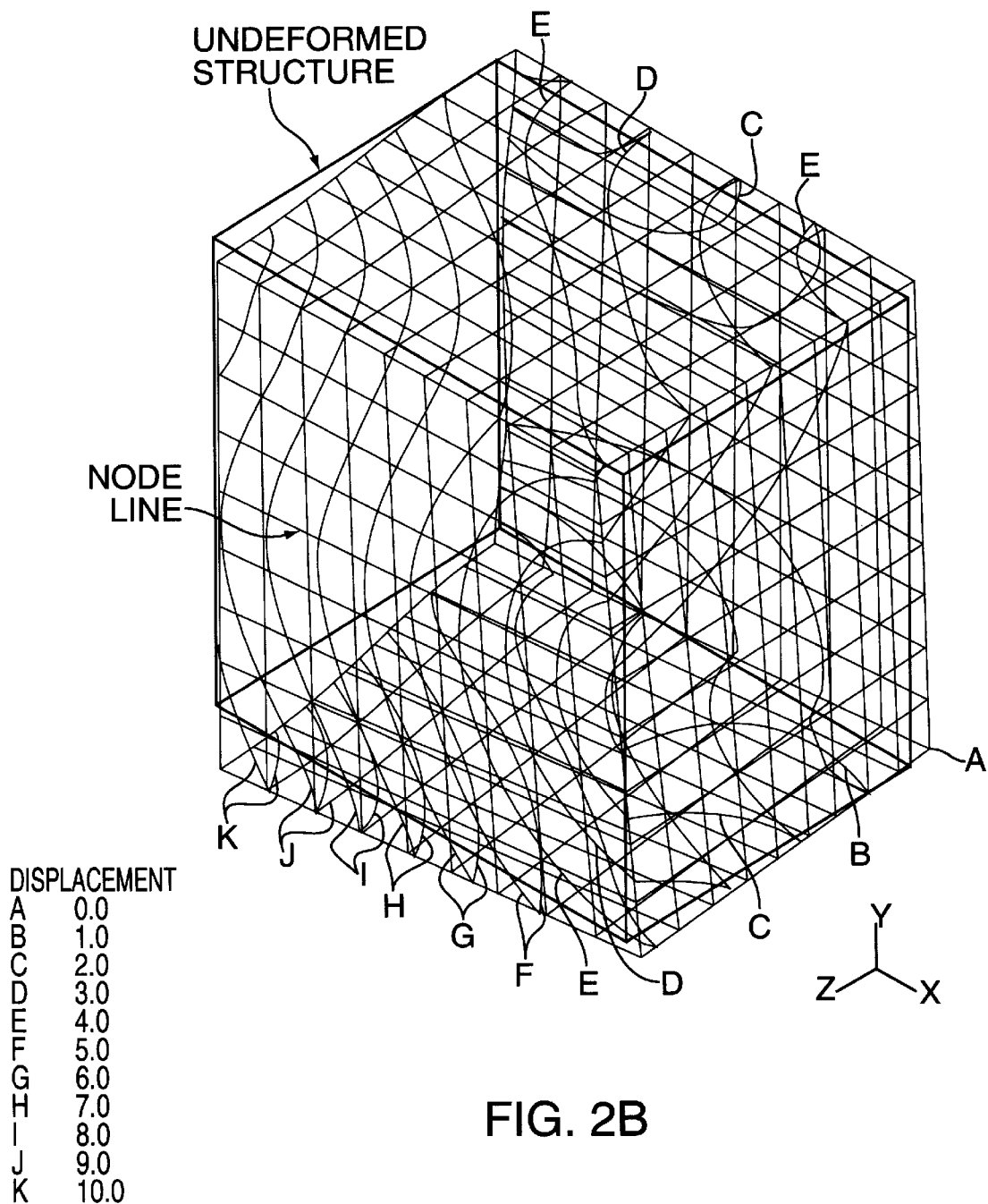
Figure 2C:
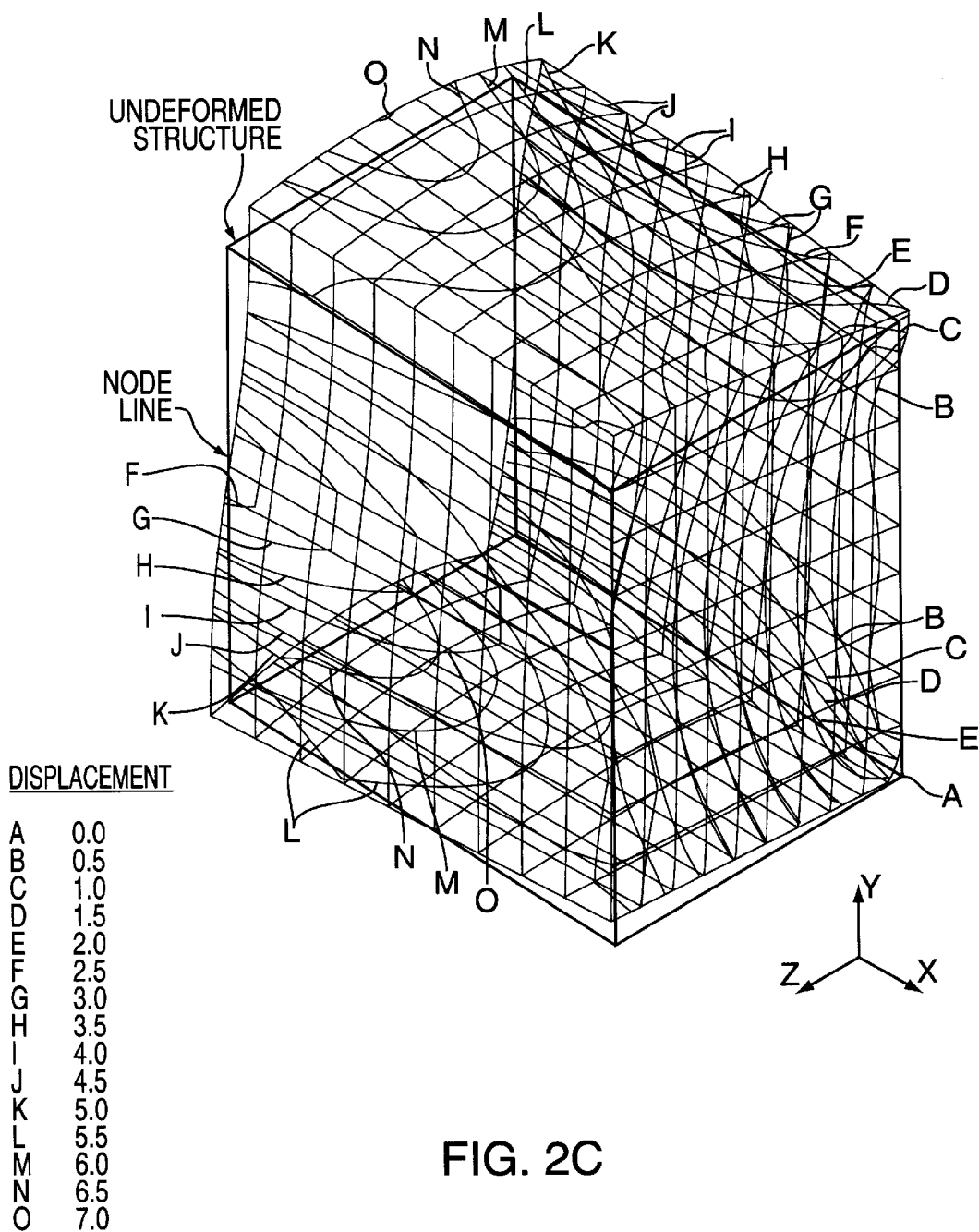

A mathematical model of the housing-cover assembly 13,15 was generated to determine the natural frequencies of the system 13,15 and to minimize the number of resonances within the forcing frequency range. The optimized mathematical model of 13,15 resulted in a first resonant frequency of 405 Hz, which is below the lowest forcing frequency of the RLG of 450 1 Hz. Relative deflection amplitudes at locations on the housing-cover assembly 13,15 for this first resonance are shown in FIG. 2A. The second resonance of 534 Hz is within the forcing frequency range of the RLG, that is between 450 Hz and 650 Hz. Relative deflection amplitudes at locations on the housing-cover assembly 13,15 for this second resonance are shown in FIG. 2B. The third resonance at 990 Hz, the relative amplitudes for which are shown in FIG. 2C, is well above the forcing frequency band. Only the second mode, the resonance at 534 Hz, is in the undesirable forcing frequency range of the RLG. It is apparent from FIG. 2A that a nodal line, a line along which the deflection is zero, exists on the center line 14a of FIG. 1. It is also evident from FIG. 2A that maximum deflection exists near locations 27a and 27c. Consequently, the identified housing assembly's nodal line, center line 14a, is used to constrain the auxiliary mass, by coupling the auxiliary mass 17 to the housing assembly at 29 and 27b. Further, the corners of the auxiliary mass 24a and 24c are respectively coupled to the corners 27a and 27c of the housing where maximum vibration suppression is required. To insure suppression of vibrations at the natural frequency of the housing-cover assembly 13,15 the auxiliary mass may be designed to vibrate at the forcing frequency in the neighborhood of 530 Hz.

Figure 3A:
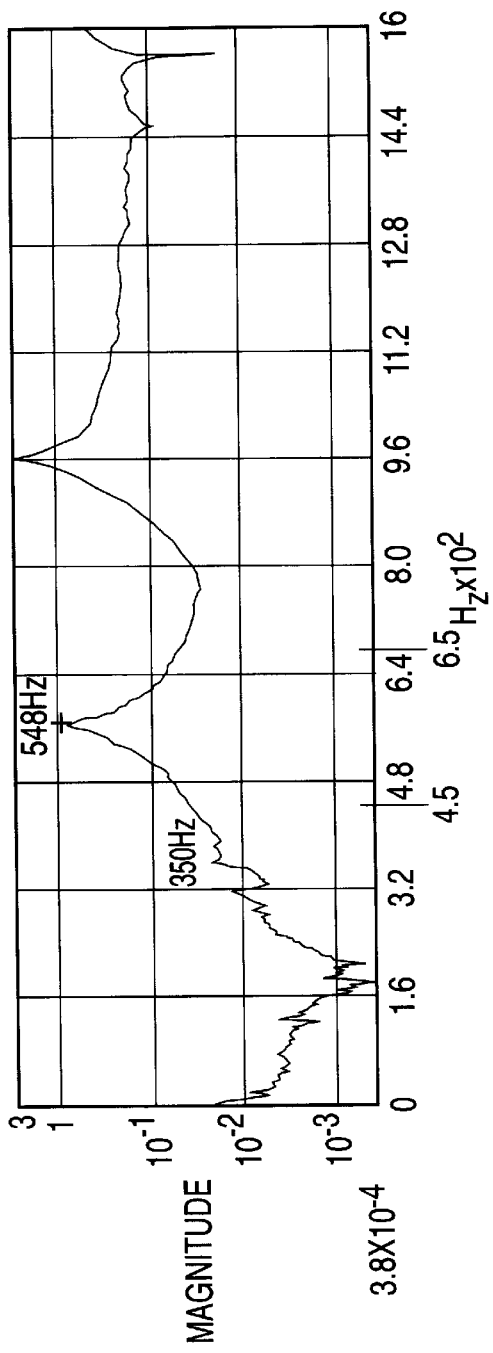
FIGS. 3A and 3B are graphs of Vibration Magnitude versus Vibration Frequency along a first axis for forced vibrations of the assembly of FIG. 1 without and with the invention, respectively.
Figure 5A:
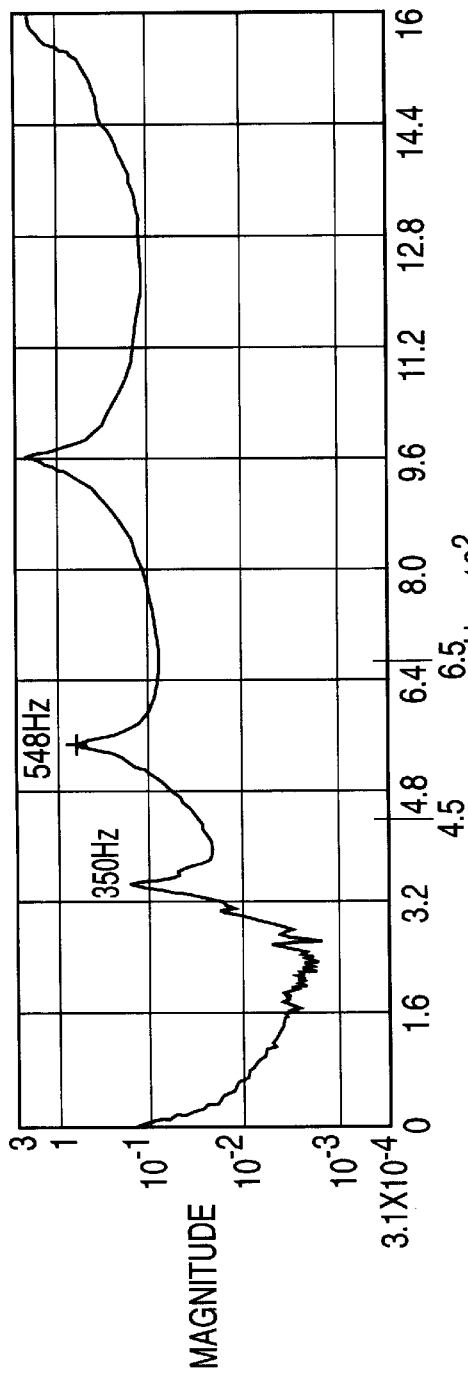
FIGS. 5A and 5B are graphs of Vibration Magnitude versus Vibration Frequency along a third axis perpendicular to said first and second axes for forced vibrations of the assembly of FIG. 1 without and with the invention, respectively.

A Housing-cover assembly with optimized wall thickness, selected material and points of constraints deduced from the analytical model was subjected to an impulse hammer test. As shown in FIGS. 3A, 4A, and 5A, the frequency response of this device was in agreement with the computed first three resonant modes.

Refer again to FIGS. 3A, 4A, and 5A wherein respectively are shown frequencies responses at a location 16 on the housing 13 of a representative housing-cover assembly 13,15 along the x, y, and z axes indicated in FIG. 1, for forcing frequencies from near zero to 1600 Hz. Resonances at the location 16 appear at 350 Hz, 548 Hz, and 960 Hz. Of these resonances only the resonance at 548 Hz is within the forcing frequency band.

To reduce the vibration amplitudes within the forcing frequency band an auxiliary mass 17 is added to the housing-cover assembly 13,15. The auxiliary mass 17 comprises a sectionalized base plate 19, which may have four sections, steel shots (BBs) 21 positioned in each section, and a cover 23. Screws 25a, 25b, and 25c, which extend through a pass-through hole at the corner 24a, a pass-through hole 24b, and a pass-through hole at the corner 24c in the cover 23 and pass-through holes 22a, 22b, and 22c in the base plate 19 to threaded holes below spacers 27a, 27b, and 27c, couple the auxiliary mass 17 to the housing assembly 13,15. A predetermined uniform air-gap between the housing 13 and the auxiliary mass 17 is achieved with the utilization of the spacers above 27a, 27b, and 27c and by seating the auxiliary mass 17 on a pad 29 on the housing 13. The BBs 21 are sized to fill each section of the base plate 19 and maintain motionless contact. For clarity, only a small number of BBs are shown in the figure. BBs 21 are utilized to provide the desired combination of mass and rigidity for the auxiliary mass 17.

The total mass of the auxiliary mass is computed to achieve the desired tuning frequency and to place the combined system resonances outside the forcing frequency band. A characteristic equation for the combined housing-cover 13,15 and auxiliary mass 17 may be provided by setting the denominator $$(1-\beta_{am}^2)(1-\beta^2)-\beta^2\mu$$

of the preceding equation to zero. Setting $\omega_n=\omega$ and rewriting the denominator as a function of $\omega_n$, $\omega_0$, $\omega_{am}$ and $\mu$ establishes the following equation $$(\omega_n^2-\omega_{am}^2)(\omega_n^2-\omega_0^2)-\omega_n^2\omega_a^2\mu=0$$

which is the characteristic equation of the combined system from which the combined system resonance frequency $\omega_n$ is computed as $$\omega_n^2 = \frac{\omega_{am}^2(1+\mu)+\omega_0^2}{2} \pm \left(\left[\frac{\omega_{am}^2(1+\mu)+\omega_0^2}{2}\right]^2 + \omega_{am}^2\omega_0^2\mu\right)^{\frac{1}{2}}$$

This equation determines the combined system resonant frequency for a selected mass ratio. Computations for various mass ratios permits the selection of a resonant frequency that is outside the forcing frequency band.

Consider a housing-cover assembly 13,15 weight of 20 lbs and selected mass ratios of 0.1, 0.2, and 0.25. The combined system resonances for these ratios can be determined for the undesired resonance of 534 Hz.

For $\mu_m=0.1$:
$\omega_{n1}=1.18\omega_{am}=630.1$ Hz
$\omega_{n2}=0.88\omega_{am}=469.9$ Hz Since $\omega_{n1}$ is within the forcing frequency band, this mass ratio is not adequate.

For $\mu=0.2$:
$\omega_{n1}=125\omega_{am}=667.5$ Hz
$\omega_{n2}=0.80\omega_{am}=427.2$ Hz which is still within the forcing Frequency band.

For $\mu=0.25$:
$\omega_{n1}=1.13\omega_{am}=694.2$ Hz
$\omega_{n2}=0.78\omega_{am}=416.5$ Hz which is adequate to place the resonant frequency of the combined system, housing-cover and auxiliary mass 13,15 and 17, outside the forcing frequency band. This mass ratio is optimum for the elimination of the housing-cover assembly 13,15 resonance. A higher mass ratio widens the dead frequency band for the combined 16 system at the expense of increasing the overall weight of the unit and the stiffness of the auxiliary mass to maintain the same $\omega_m$. This is not attractive. Thus the total weight of the auxiliary mass, $m_{am}$, is 5 lbs (0.25×20 lbs.). Since weight is equal to mass times the acceleration of gravity (w=mg; g=386 in/s$^2$), the total mass of the auxiliary mass 17 is 0.01295 lbs.s$^2$/in. Since the rigidity of the auxiliary mass may be determined from $k_{am}=\omega_{am}^2 m_m$, the rigidity $k_{am}$ of the auxiliary mass 17 may be $(534\times 2p)^2\times 0.01295=145785$ lbs/in, which is its total spring stiffness.

The construction of the auxiliary mass 17 and the screws 25a, 25b, and 25c establish a tuning mass-spring system, which may be fine tuned to the undesired forcing frequency by adjusting the torque on the screws, to counteract forced vibrations of the housing-cover assembly 13,15. Attachment points 27a, 27b, and 27c on the housing 13 for accepting the coupling screws 25a, 25b, and 25c, respectively, are selected to maximize the housing-cover 13,15 motion suppression and to enhance the stability of the auxiliary mass 17 during externally induced sinusoidal and random environmental vibration at the resonance frequency of the combined structure. The reactive force performance of the auxiliary mass 17 is significantly increased by triangularly positioning coupling points 27a, 27b and 27c as shown in FIG. 1. Positioning the coupling points in this manner enforces nodes at locations 24a and 24c for the forced vibration frequency. Optimal tuning is achieved by adjusting the torque on the screws 25a and 25c to drive points 27a and 27c to lie in a horizontal fixed plane.

The auxiliary mass 17 is constructed and arranged to have a natural frequency that is substantially equal to the undesired frequency in the forcing frequency band and a flexural mode substantially identical to that of the housing-cover assembly 13,15. The material of the base plate 19 and cover 23, the weight of the BBs 21, and the torque on the screws 25a, 25b, and 25c are selected to provide a stiffness $k_{am}$ and a mass $m_{am}$ so that the ratio $k_{am}/m_{an}=\omega_{am}$ is approximately equal to the oscillating frequency of the housing-cover assembly 13,15 as excited by the forcing frequency. Consequently, the vibrations of the assembly 13,15 are countered by the addition 16 of the auxiliary mass 17 causing a significant reduction in the vibrations of the overall system.

Attaching the auxiliary mass as described above creates a zero motion zone (vibration node) at locations 24a and 24c respectively coupled to locations 27a and 27c. This is achieved by locating the auxiliary mass inherent nodal line 26 parallel 21 to the nodal line 14a of the housing 13 defined by the two points 29 and 27b. The auxiliary mass is activated when the pad 29 on upper wall 13a of the housing 13 establishes contact with the auxiliary mass and with the torque applications on the hardware 25a, 25b and 25c. It should be recognized that the addition of the auxiliary mass assembly 17 to the housing 13 without a spacer pad 29, results in a full surface-to-surface contact along the entire upper wall surface of 13a. This tends to add the auxiliary mass $m_{am}$ directly to the housing-cover mass $m_0$ for a total combined system mass of $(m_{total}=m_0+m_{am})$ with negligible $k_{am}$ contribution such that $\omega_{am}<<\omega$ and $\beta_{am}\sim 0$ which yields an undesired application of vibration amplitude $$x_0=(P_0/k)/[(1-\omega^2/(k/m_{total})]$$

Figure 3B:
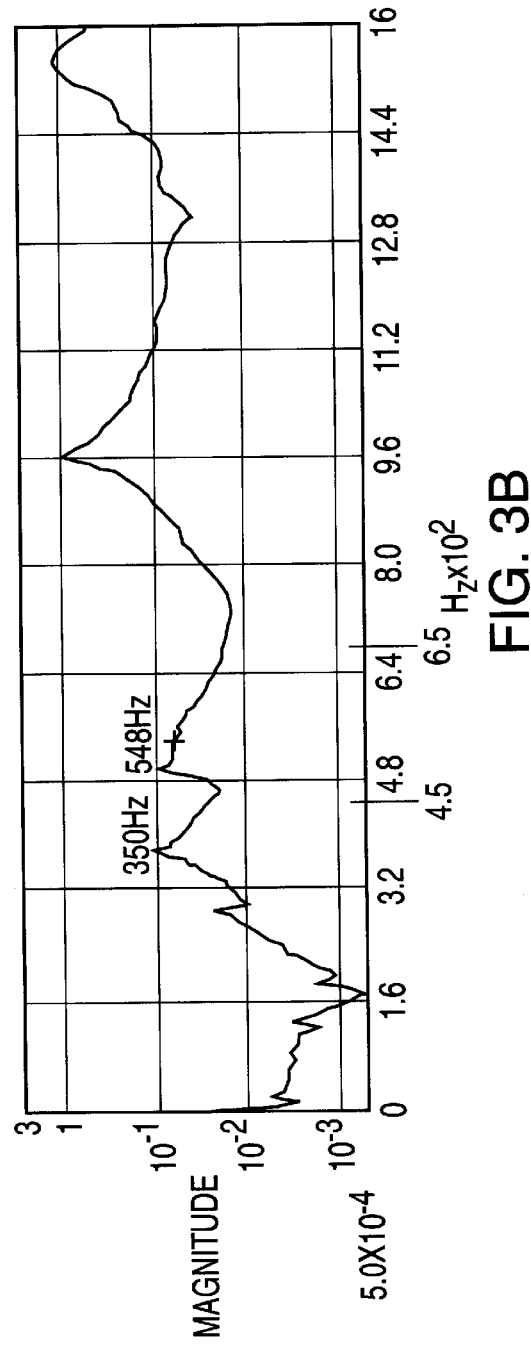
Figure 5B:
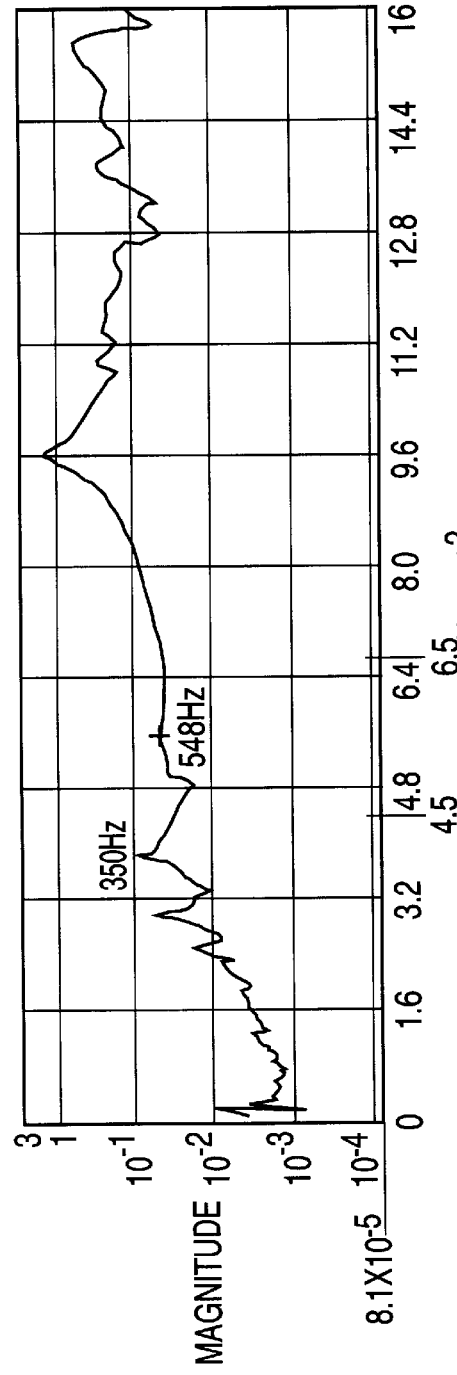

Refer now to FIGS. 3B, 4B, and 5B. These figures show the frequency responses at point 16 of the housing 13 along the x, y, and z axes, respectively, with the addition of the auxiliary mass 17. A comparison of the frequency response in FIG. 3B With the frequency response in FIG. 3A clearly indicates a significant reduction of the vibration amplitudes along the x axis in the 450 Hz to 650 Hz frequency band of interest. The magnitude of the vibrations at 548 Hz, at which a resonance occurs without the auxiliary mass 17, has been reduced by more than 20 dB with vibration amplitude reductions throughout the band. Similar results are evident for vibration amplitudes along the y axis and z axis when FIG. 4B is compared with FIG. 4A and FIG. 5B is compared with FIG. 5A.

While the invention has been described in its preferred embodiments, it is to understood that the words that have been used are words of description rather than limitation and that changes may be made within the purview of the appended claims without departing from the true scope and spirit of the invention in its broader aspects.

I claim:

1. A method for reducing noise generated by forced vibrations of a structure, the forced vibrations being within a forced vibration frequency band having a first band end and a second band end comprising the steps of:

constructing a mass to vibrate in response to applied external forces; and coupling said mass to said structure in a manner to form a composite structure wherein said external forces are provided by vibrations of said structure such that said composite structure vibrates at vibration frequencies within said forced vibration frequency band with vibration frequency amplitudes that are lower than vibration frequency amplitudes, within said forced vibration frequency band, of said structure.

2. A method in accordance with claim 1 further including the steps of:

constructing said structure to have a natural frequency out of said frequency band adjacent said first band end; and constructing said mass to have a natural frequency outside of said frequency band adjacent said second band end.

3. A method in accordance with claim 1 wherein said mass constructing step includes the steps of:

providing a sectionalized plate having a plurality of sections;

filing each section of said sectionalized plate with a plurality of steel shots; and placing a plate on said sectionalized plate to retain said steel shots.

4. A method in accordance with claim 3 wherein said filing step includes the step of sizing said steel shots to fill and maintain motionless contact in said plurality of sections.

5. A method in accordance with claim 3 further including the steps of:

creating tapped holes in said structure at predetermined locations;

establishing pass-through holes in said sectionalized plate and said plate at positions corresponding to said predetermined locations; and passing screws through said pass-through holes into said tapped holes; and tightening said screws to tune vibration frequencies of said mass.

6. A method in accordance with claim 5 further including the steps of arranging said tapped holes and said pass-through holes in a triangular pattern having an apex on center lines of said structure and said mass.

7. A method in accordance with claim 6 further including the step of providing spacers on said structure to maintain a predetermined distance between said structure and said mass.

8. A method in accordance with claim 7 further including the step of providing a pad on said center line of said structure that activates said mass.

9. A method in accordance with claim 1 wherein said coupling step includes the step of attaching said mass to said structure in a manner to establish node zones at selected locations in said mass.

10. A method in accordance with claim 1 wherein said coupling step includes the step of locating an inherent nodal line in said mass in parallel with an inherent nodal line in said structure.

11. An apparatus comprising:

a structure subjected to forced vibrations causing vibration frequencies within a vibration frequency band having a first band end and a second band end; and a mass, coupled to said structure to form a composite structure, said mass constructed to vibrate in response to external forces provided by said structure, said composite structure constructed and arranged to reduce vibration frequency amplitudes of vibration frequencies within said vibration frequency band.

12. An apparatus in accordance with claim 11 wherein said mass comprises:

a sectionalized plate having a plurality of sections;

a plurality of steel shots positioned in and filling each of said plurality of sections; and a plate positioned on said sectionalized plate over said steel shots.

13. An apparatus in accordance with claim 12 wherein said plurality of steel shots are sized to fill and maintain motion less contact in said plurality of sections.

14. An apparatus in accordance with claim 12 wherein said steel shots are immovably positioned in said sections.

15. An apparatus in accordance with claim 14 wherein said steel shots are of equal diameter.

16. An apparatus in accordance with claim 11 wherein said structure contains a plurality of tapped holes, said mass contains a plurality of pass-through holes corresponding to said tapped holes, and wherein said mass is coupled to said structure by screws passed through said pass-through holes into said tapped holes.

17. An apparatus in accordance with claim 16 wherein:

said tapped holes and said pass-through holes are arranged in a triangular pattern having an apex on center lines of said structure and said mass, respectively.

18. An apparatus in accordance with claim 16 wherein said screws are torqued to tune vibrations of said mass.

19. An apparatus in accordance with claim 11 wherein said mass is coupled to said structure in a manner to establish node zones at selected locations in said mass.

20. An apparatus in accordance with claim 11 wherein an inherent nodal line in said mass is positioned in parallel with an inherent nodal line in said structure.

* * * * *